(12) United States Patent
Teng et al.

(10) Patent No.: US 10,782,714 B2
(45) Date of Patent: Sep. 22, 2020

(54) HEAT DISSIPATION SYSTEM AND METHOD FOR SMART PIANOS

(71) Applicant: SUNLAND INFORMATION TECHNOLOGY CO., LTD., Shanghai (CN)

(72) Inventors: Yangyi Teng, Shanghai (CN); Shaolin Yang, Shanghai (CN); Jianli Zhao, Shanghai (CN)

(73) Assignee: SUNLAND INFORMATION TECHNOLOGY CO., LTD., Shanghai (CN)

( * ) Notice: Subject to any disclaimer, the term of this patent is extended or adjusted under 35 U.S.C. 154(b) by 226 days.

(21) Appl. No.: 16/057,606

(22) Filed: Aug. 7, 2018

(65) Prior Publication Data
US 2018/0348802 A1    Dec. 6, 2018

Related U.S. Application Data

(63) Continuation of application No. PCT/CN2017/070382, filed on Jan. 6, 2017.

(51) Int. Cl.
*G05D 23/19* (2006.01)
*G10H 1/00* (2006.01)
(Continued)

(52) U.S. Cl.
CPC ......... *G05D 23/1917* (2013.01); *G01K 13/00* (2013.01); *G05B 15/02* (2013.01);
(Continued)

(58) Field of Classification Search
None
See application file for complete search history.

(56) References Cited

U.S. PATENT DOCUMENTS

| 5,600,521 A | 2/1997 | Kondo |
| 2003/0191597 A1* | 10/2003 | Van Sant ................ G10F 1/02 |
| | | 702/99 |

(Continued)

FOREIGN PATENT DOCUMENTS

| CN | 205680412 U | 11/2016 |
| JP | H09269773 A | 10/1997 |

(Continued)

OTHER PUBLICATIONS

International Search Report in PCT/CN2017/070382 dated Oct. 9, 2017, 5 pages.

(Continued)

*Primary Examiner* — Ramesh B Patel
(74) *Attorney, Agent, or Firm* — Metis IP LLC (57) ABSTRACT

A heat dissipation system for a smart piano may include a heat dissipation driver, a heat dissipation device, a sensor, a protection circuit and a hardware processor. The sensor may be configured to detect a thermal parameter of an execution device of the smart piano. The protection circuit may be configured to analyze the thermal parameter to generate a protection signal. The hardware processor may be configured to determine a preset algorithm, generate a control signal according to the protection signal and the preset algorithm, and control a heat dissipation condition of the smart piano. The controlling the heat dissipation condition of the smart piano may include control an operation condition of the execution device and/or the heat dissipation device. The controlling may include controlling an output power of the execution device and/or the heat dissipation device.

20 Claims, 7 Drawing Sheets

(51) Int. Cl.
*G10H 1/34* (2006.01)
*G05B 15/02* (2006.01)
*G10F 1/02* (2006.01)
*G01K 13/00* (2006.01)

(52) U.S. Cl.
CPC ............. *G10F 1/02* (2013.01); *G10H 1/0008* (2013.01); *G10H 1/0066* (2013.01); *G10H 1/344* (2013.01); *G10H 2220/351* (2013.01); *G10H 2230/011* (2013.01)

(56) References Cited

U.S. PATENT DOCUMENTS

| | | | | |
|---|---|---|---|---|
| 2010/0101395 A1* | 4/2010 | Ohnishi | ................ | G01K 13/00 84/20 |
| 2015/0194799 A1* | 7/2015 | Ishii | ................ | G10H 3/22 361/103 |
| 2016/0034416 A1* | 2/2016 | Chavez | ................ | G06F 13/426 381/59 |
| 2016/0299629 A1* | 10/2016 | Doyle | ................ | H01L 27/323 |
| 2016/0372097 A1* | 12/2016 | Rogers | ................ | G10H 1/44 |
| 2017/0358237 A1* | 12/2017 | Yuen | ................ | G09B 15/023 |
| 2018/0342229 A1* | 11/2018 | Yan | ................ | G06F 3/0426 |

FOREIGN PATENT DOCUMENTS

| | | |
|---|---|---|
| JP | 2009204798 A | 9/2009 |
| WO | 2002082476 A2 | 10/2002 |

OTHER PUBLICATIONS

Written Opinion of the International Searching Authority in PCT/CN2017/070382 dated Oct. 9, 2017, 4 pages.
First Office Action in Chinese Application No. 201780007991.8 dated Apr. 3, 2019, 13 pages.

* cited by examiner

HEAT DISSIPATION SYSTEM AND METHOD FOR SMART PIANOS

CROSS-REFERENCE TO RELATED APPLICATION

This application is a Continuation of International Application No. PCT/CN2017/070382, filed on Jan. 6, 2017, the content of which is incorporated herein by reference.

TECHNICAL FIELD

This application relates to a smart piano system and, more particularly, to an automatic player piano equipped with an overheat protection system.

BACKGROUND

A piano system may include an acoustic piano and an electronic system. It may contain a pneumatic or electro-mechanical mechanism that operates the piano action via pre-programmed music recorded on perforated paper with more modern implementations using MIDI encoded music stored on floppy disks or CDs. The piano system may also have a tone generator and manipulators, such as keys and pedals. The manipulators may be used in fingering for specifying a pitch of tones. The tone generator is connected to the manipulators and produces the tones at the specified pitch. People can selectively depress and release the manipulators in his or her performance. The piano system may depress and release the manipulators in an automatic performance using solenoid actuators. The MIDI files can trigger solenoid actuators, which use electric current to drive small mechanical pistons mounted to the key action inside the piano. While the current flows through the solenoid actuators, the solenoids may produce electromagnetic fields to control the manipulators which may generate tones. At the same time, the solenoids may produce heat. If an excessive amount of heat may damage the solenoid actuators. Accordingly, it would be desirable to provide a heat dissipation system and method to prevent the piano system from overheating.

SUMMARY

According to an aspect of the present disclosure, a method for heat dissipation for a smart piano may include: detecting a thermal parameter of an execution device of the smart piano; analyzing the thermal parameter to generate a protection signal; determining a preset algorithm; generating, by a hardware processor, a control signal according to the protection signal and the preset algorithm; and controlling a heat dissipation condition of the smart piano.

In some embodiments, the heat dissipation condition of the smart piano may be controlled by controlling an operation condition of the execution device.

In some embodiments, the analyzing the thermal parameter to generate a protection signal may include converting the thermal parameter into an electrical signal.

In some embodiments, the determining the preset algorithm may include adjusting the preset algorithm based on the protection signal.

In some embodiments, the controlling the heat dissipation condition of the smart piano may further include controlling an operation condition of a heat dissipation device.

In some embodiments, the method may further include calculating the heat dissipation condition according to the operation condition of the execution device.

In some embodiments, the controlling the operation condition of the execution device may include controlling an output power of the execution device.

In some embodiments, the method may further include calculating the heat dissipation condition according to the operation condition of the heat dissipation device and the operation condition of the execution device.

In some embodiments, the controlling the operation condition of a heat dissipation device may include controlling an output power of the heat dissipation device.

In some embodiments, the method may further include: comparing the heat dissipation condition with a threshold; and determining whether to perform at least one heat dissipation operation based on the comparison result.

According to another aspect of the present disclosure, a heat dissipation system for a smart piano may include a heat dissipation driver, a heat dissipation device, a sensor, a protection circuit, and a hardware processor. The sensor may be configured to detect a thermal parameter of an execution device of the smart piano. The protection circuit may be configured to analyze the thermal parameter to generate a protection signal. The hardware processor may be configured to determine a preset algorithm, generate a control signal according to the protection signal and the preset algorithm, and control a heat dissipation condition of the smart piano.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
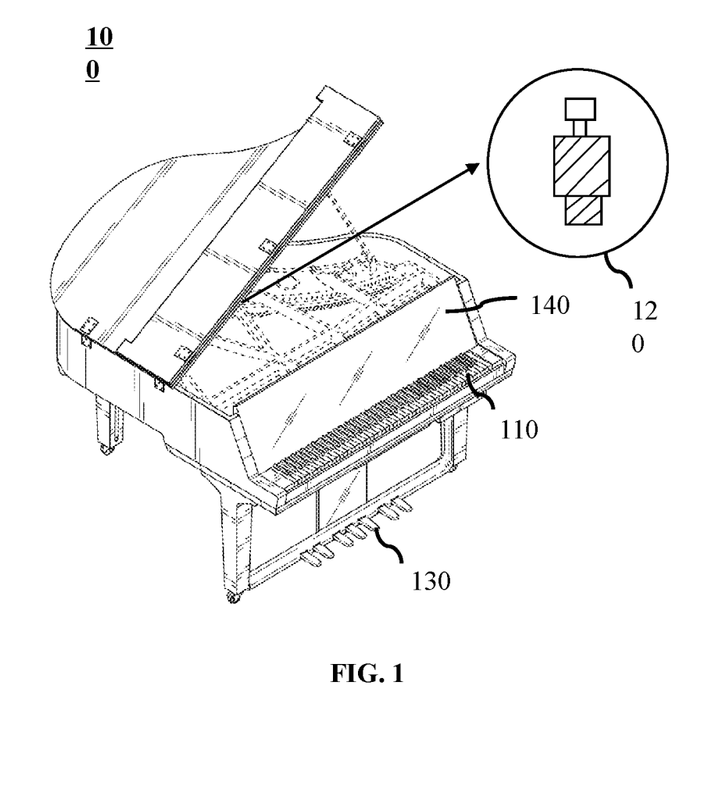
FIG. 1 is a schematic diagram illustrating a smart piano according to some embodiments of the present disclosure.

FIG. 1 is a schematic diagram illustrating a smart piano according to some embodiments of the present disclosure. As shown in FIG. 1, the smart piano may include a keyboard 110, one or more pedals 130, a display 140, and any other components for implementing a piano. A solenoid actuator 120 may be included in the smart piano as a kind of execution device. If a player depresses and/or releases the keyboard 110, a tone may be generated. A smart piano may include an automatic playing system. The solenoid actuator 120 may be installed inside the automatic playing system, and is activated with electric power. It is a necessary part of the automatic playing system which may drive the piano to paly automatically. Since it is an important component to execute mechanical motion. While the music code file is imported in the piano, the solenoid actuator 120 may be activated and may drive a hammer to strike the strings, and the keyboard 110 may be selectively depressed and released without human player. The operation of the solenoid actuator 120 may produce heat. The present disclosure provides a system and method to protect the actuator from overheating. The other components included in the smart piano may include but not limited to a tone generator, a piano wire, damper pedal, a damper, a soundboard, a hammer, or the like, or a combination thereof.

Figure 2:
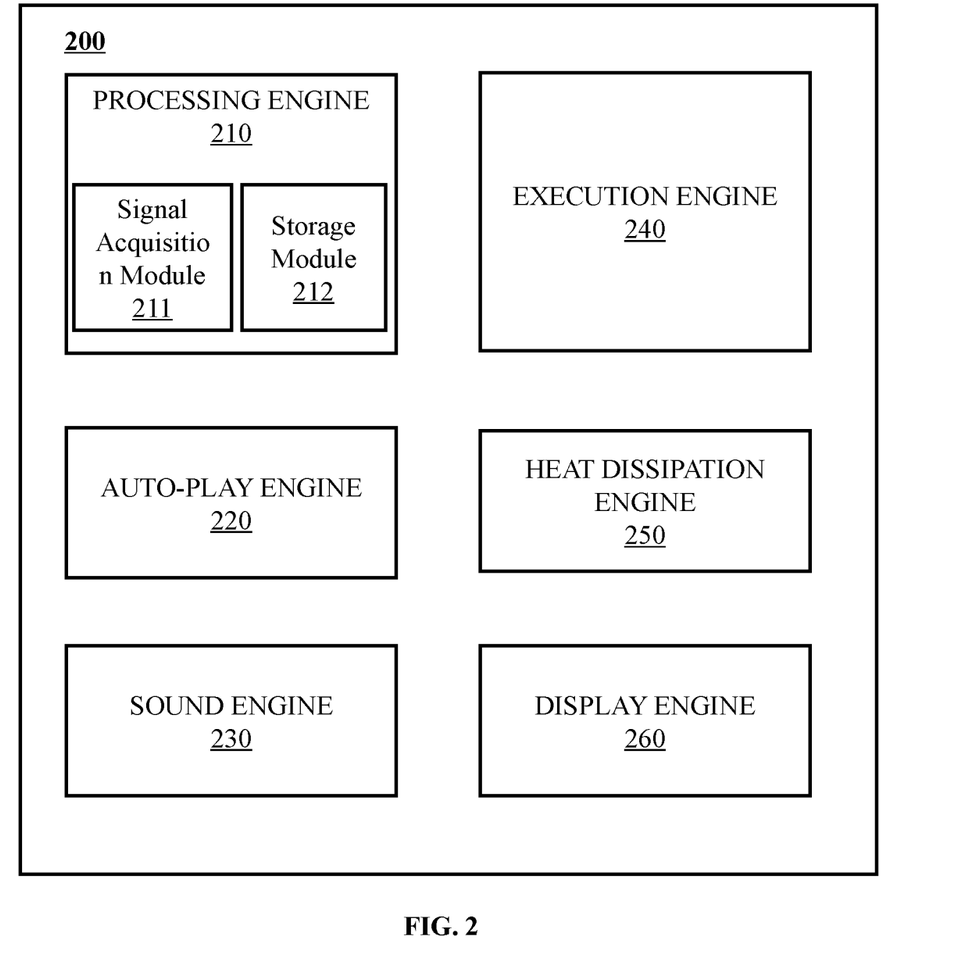
FIG. 2 is a block diagram illustrating a smart piano system according to some embodiments of the present disclosure.

FIG. 2 is a block diagram illustrating a smart piano system according to some embodiments of the present disclosure. As shown in FIG. 2, a smart piano system 200 may include a processing engine 210, an auto-play engine 220, a sound engine 230, an execution engine 240, a heat dissipation engine 250, a display engine 260, and/or any other components for providing a smart piano system 200. More or fewer components may be included in smart piano system 200 without loss of generality. For example, two of the modules may be combined into a single module, or one of the modules may be divided into two or more modules. In one implementation, one or more of the modules may reside on different computing devices (e.g., desktops, laptops, mobile phones, tablet computers, wearable computing devices, etc.).

The processing engine 210 may be and/or include any device that is capable of obtaining, processing, storing, and/or performing other function on information. The processing engine 210 can include a signal acquisition module 211 and a storage module 212. The signal acquisition module 211 may obtain information about a performance by a player (also referred to herein as "performance information"). The performance information may include but is not limited to information about the keys of piano that are depressed or released during a performance, pressure information about the keys (e.g., a degree of depressing the keys), time information about the keys (e.g. a time corresponding to a position of a key), rhythm of pressing the keys, one or more operation sequences of the keys, timing information about when a user applies one or more pedals 130, and musical notes produced according to motions of the keys/pedals. The performance information may be generated based on one or more key signals and/or pedal signals. In some embodiments, each of the key signals and pedal signals may be an electric signal represented by current values, voltage values, and/or any other parameter. The performance information may be acquired from auto-play engine 220 or execution engine 240. In some embodiments, the performance information may also be obtained without the player fingering on the keyboard. When a player fingers on the keyboard of the piano and/or operates the pedals, the performance information may be recorded. The performance information may be stored in the storage device 212 and/or any other storage device.

The processing engine 210 may include one or more processor-based and/or microprocessor-based units. Merely by way of example, the processor (e.g., a hardware processor) may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an acorn reduced instruction set computing (RISC) machine (ARM), any other circuit and/or processor capable of executing the functions described herein, the like, or any combination thereof.

The storage module 212 may be and/or include any device that is capable of storing data, such as data provided by the auto-play engine 220, the sound engine 230, the execution engine 240, the heat dissipation engine 250, the display engine 260, and/or any other device. Exemplary types of data that may be stored in the storage device 212 may include key signals and pedal signals acquired by the signal acquisition module 211, musical note data from the auto-play engine 220, temperature information from the heat dissipation engine 250, instruction information from the display engine 260, and/or any other type of data that may be used to implement an smart piano system in accordance with various embodiments of the present disclosure. The storage module 212 may include one or more components. In some embodiment, the storage module 212 can be and/or include hard disk drive, magnetic tape, a removable storage drive (e.g., phase change rewritable optical disk drive, magneto-optical, USB removable hard disk, etc.), a micro-drive, the like, or a combination thereof.

The auto-play engine 220 may be configured to automatically present musical data. The musical data may be obtained from the storage device 212, the display engine 260, and/or any other device. The musical data may be a recorded musical piece from the storage device 212. Exemplary musical data may include keys that are depressed or released, timing of operating one or more pedals, pressure on the pedals, one or more musical notes to be produced, etc. The auto-play engine 220 may generate sounds and/or images based on the musical data. Merely by way of example, after musical notes are played by the player and stored as musical data in the storage device 212 by the automatic player piano system, the auto-play engine 220 may automatically acquire the musical data. The auto-play engine 220 may provide signals to sound engine 230. The auto-play engine 220 may also generate musical data and instructions for display engine 260 which will present images accordingly.

The sound engine 230 may include any device that is capable of generating audio content representative of acoustic sounds or electronic sounds. The device may be a voice synthesizer, speaker, musical file, etc. The sound engine 230 may be configured to generate electronic sounds and/or acoustic sounds. The acoustic sounds may be generated by acoustic parts of the piano 100, such as keys, pedals, hammers, strings, and/or any other portion of the smart piano 100 that can generate an acoustic sound. In some embodiments, the sound engine 230 may generate audio content using one or more synthesizers, sequencers, audio codecs, digital processors, and/or any other device that may generate audio content representative of electronic sounds. In some embodiments, the sound engine 230 may cause one or more actuators (not shown in FIG. 1) to generate acoustic sounds. The actuators may operate the keys/pedals under instructions provided by the execution engine 240 and/or the sound engine 230. In some embodiments, the sound engine 230 may produce sounds based on musical data provided by the storage device 212, and/or any other device. Merely by way of example, the piano system may fetch musical data from a computing device (e.g., a desktop computer, tablet computer, laptop computer, tablet computer, wearable computing device, etc.). Then, the musical data may be converted into a form that is recognizable by the sound engine 230 and the display engine 260. And the sound engine 230 and the display engine 260 may present the musical data accordingly.

The execution engine 240 may include a device of the smart piano system that may execute mechanical motion, such as solenoid actuator, key actuator, pedal actuator, motor, etc. During the operation of the smart piano 100, the mechanical motion of the device may generate heat. In some embodiments, the execution engine 240 may obtain a control signal from auto-play engine 220, sound engine 230, heat dissipation engine 250, storage module 212, and/or any other devices of the smart piano system 200. The execution engine 240 may start work after receiving a control signal (keys that are depressed or released, timing of operating one or more pedals, pressure on the pedals) from auto-play engine 220. The execution engine 240 may also start work after receiving the recognizable musical code provided by the sound engine 230. The recognizable musical code may come from recorded music file, the Internet, and/or any other device. In some embodiments, the execution engine 240 may choose to stop work according to the thermal parameters provided by heat dissipation engine 250, merely by way of example, if the heat dissipation condition does not satisfy a preset threshold, the execution engine will not work. Exemplary the heat dissipation condition may include the value of heat, temperature information, a current value, a voltage value, a control signal, etc. The execution engine 240 can also receive key signals and pedal signals from storage module 212. In some embodiments, the execution engine 240 may operate solenoid actuator, key actuator, pedal actuator and motor when activated.

The heat dissipation engine 250 may be configured to execute a heat dissipation process to protect the smart piano 100 from overheating. The heat dissipation engine 250 may include one or more components, such as temperature sensor, an active heat sink, a heat dissipation driver, a detection circuit, protection circuit, a preset algorithm circuit, a comparator, or the like, or a combination thereof. The heat dissipation condition may be determined according to a value of heat, temperature information, current value, a voltage value, a control signal, etc. In some embodiments, the value of heat and temperature information may be provided by a temperature sensor. The temperature sensor may be equipped with the heat dissipation engine 250. The active heat sink may include a cooling fan, cooling water pipe, and the like. The heat dissipation engine 250 may determine the heat dissipation condition according to a signal transmitted by a comparator. For instance, in one performance, the execution engine 240 is activated, the current value of heat may be recorded and after a period of time interval, the renewed value of heat may also be recorded. The comparator may process the data and output a signal. In some embodiments, the heat dissipation condition is provided by the control signal transmitted by the preset algorithm circuit. In some embodiments, the preset algorithm is set according to the average temperature of the execution engine 240. If the temperature value is greater than the preset temperature value, the heat dissipation engine 250 may start work in a high power mode.

The display engine 260 may include one or more display devices that may present musical data and/or any other content. Alternatively or additionally, the display engine 260 may be communicatively coupled to one or more display devices. The display engine 260 may provide the content and/or any other data to the display devices for presentation. Exemplary display devices include but are not limited to a liquid crystal display (LCD), a light-emitting diode (LED)-based display, a flat panel display or curved screen, a television device, a cathode ray tube (CRT), the like, or a combination thereof. In some embodiments, one or more of the display devices may be three-dimensional capable. One or more of the display devices can include a touchscreen. In some embodiments, different display devices (e.g., displays of various types, shapes, sizes, etc.) may be selected and used for different types of pianos. For example, the size of the display device may be adapted to the size of the piano 100. More particularly, for example, a larger display may be used for a relatively larger piano (e.g., a grand piano) while a smaller display may be used for a relatively smaller piano (e.g., an upright piano, a baby grand piano, etc.). The display engine 260 may present musical data such as a piece of music, a video of the music, a musical note, etc. This information may be used to complete the performance.

Figure 3:
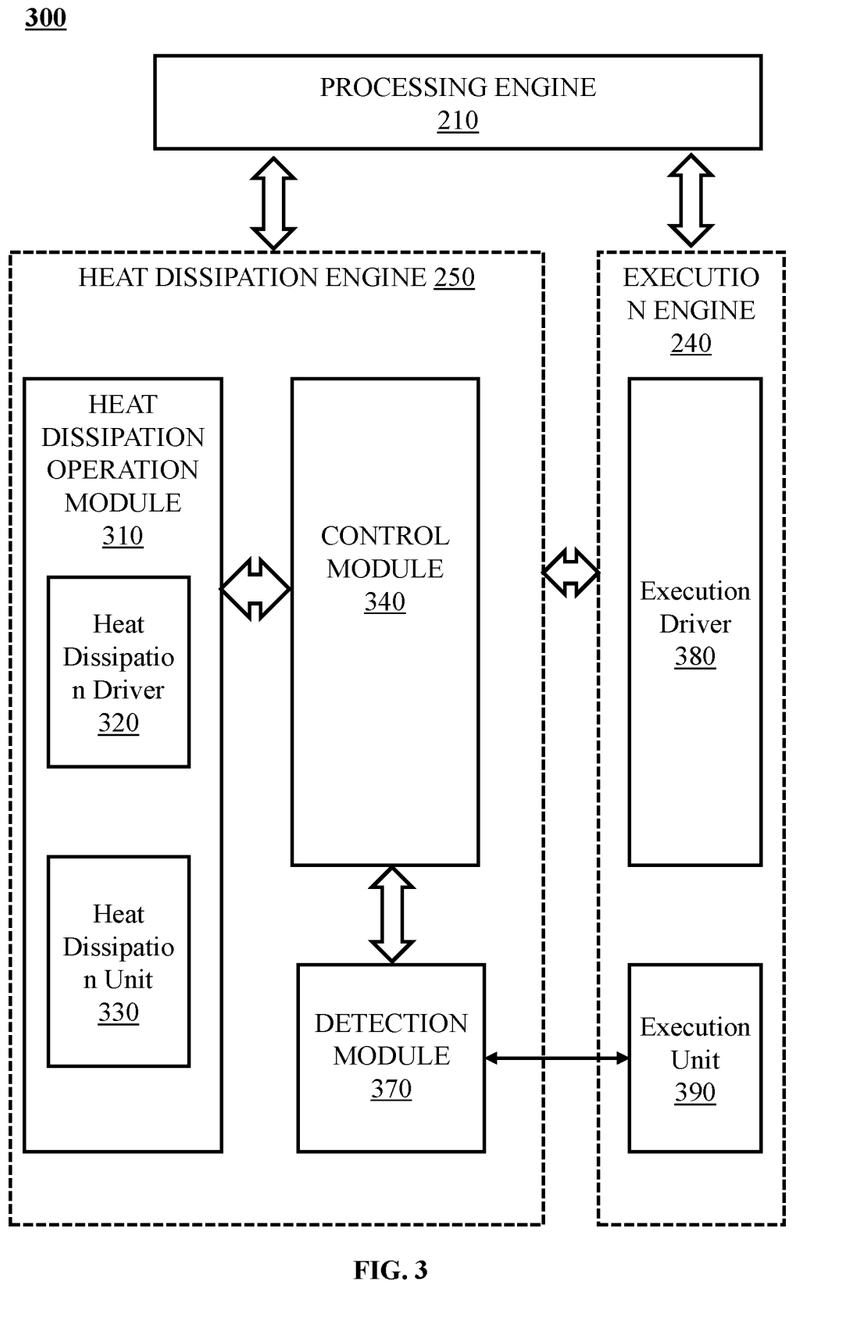
FIG. 3 is a block diagram illustrating an example of a heat dissipation system of a smart piano system according to some embodiments of the present disclosure.

FIG. 3 is a block diagram illustrating an example 300 of a heat dissipation system of a smart piano system according to some embodiments of the present disclosure. The heat dissipation system may include the processing engine 210, the heat dissipation engine 250, and the execution engine 240. As shown in FIG. 3 the heat dissipation engine 250 may include a heat dissipation operation module 310, a control module 340, a detection module 370, and/or any other components (not shown in the figure) for processing, transmitting, storing, detecting signals for the smart piano system. One or more components may be included in heat dissipation engine 250 without loss of generality. For example, two of the modules may be combined into a single module, or one of the modules may be divided into two or more modules. In some embodiments, the heat dissipation engine 250 may communicate with other components, such as processing engine 210, execution engine 240, etc.

The heat dissipation operation module 310 may be configured to execute a heat dissipation process. The heat dissipation operation module 310 may be controlled by the control module 340 to execute the heat dissipation process. In some embodiments, the heat dissipation operation module 310 may include but not limited to a heat dissipation driver 320 and a heat dissipation unit 330. The heat dissipation driver 320 may receive a control signal from the control module 340. The control signal may include information about one or more operation modes (e.g., a high power mode, a low power mode, etc.), operation instructions, logical signals, one or more heat dissipation conditions, or the like, or a combination thereof. In some embodiments, the heat dissipation operation module 310 may work in different working modes in different conditions. As used herein, the high power mode may be operated if the thermal parameter is greater than a preset threshold. The low power mode may be operated if the heat value is less than the preset threshold. Merely by way of example, upon receiving the control signal, the heat dissipation driver 320 may generate a driver signal and may transmit the driver signal to the heat dissipation unit 330. The heat dissipation unit 330 may be operated based on the driver signal. Exemplary heat dissipation units include but are not limited to a cooling fan, a cooling water pipe, a fuse wire, a thermal fusing component, etc. In some embodiments, the heat dissipation driver 320 may include one or more thyristor trigger circuits, GTO drive circuits, GTR drive circuits, MOSFET drive circuits, IGBT drive circuits, or the like, or a combination thereof.

The control module 340 may be configured to generate one or more control signals to control one or more operations performed by the heat dissipation operation module 310. The control module 340 may also generate one or more control signals to control one or more components of the system 100 to perform various functions, such as generating signals, receiving data, processing data, transmitting data, etc. The control module 340 may process data provided by the signal acquisition engine 211, the storage device 212 or any other components of the smart piano system.

In some embodiments, the control module 340 may generate one or more control signals based on information provided by the detection module 370. For instance, the detection module may detect the thermal parameters of the execution unit 390 and transmit the thermal parameters to the control module 340. The control module 340 may generate a control signal including a first control signal to drive the heat dissipation driver 320 to control the heat dissipation unit 330 to work in a suitable working condition. The control module 340 may generate the control signal including a second control signal based on the detection module 370. For example, the control module 340 may control the working condition of the execution unit 390 by transmitting the second control signal to the execution driver 380.

The detection module 370 may be configured to detect the thermal parameters of the smart piano system. Merely by way of example, the detection module 370 may include a temperature sensor, a thermal sensor, an intelligent presence sensor, a voltage/current measurement circuit, a detection circuit, or the like, or a combination thereof. The detection module 370 may detect the thermal parameters related to the execution unit 390. The thermal parameters may be represented by a value of temperature value, a heat value, a current value, a voltage value, and/or any other parameters. In some embodiments, the detection module 370 may process the thermal parameters to generate a signal and transmit the signal to the control module 340. The process may be executed by a comparator, a compare circuit, or the like, or a combination thereof.

The execution engine 240 may include an execution driver 380 and an execution unit 390. The execution driver 380 may generate a driver signal to control the execution unit 390 based on the second control signal. In some embodiments, the execution engine 240 may receive a control signal including the second control signal. The second control signal may be generated by the control module 340 and/or the processing engine 210, and/or any other devices with the same function. The control module 340 may transmit the second control signal to the execution engine 240. Upon transmission of the second control signal, the execution engine 240 may determine the working condition of the execution unit 390. For example, the execution unit 390 may be stopped or turned down the input power of which according to the second control signal. In some embodiments, the second control signal transmitted from the control module 340 may be a threshold stored in the storage module 212, a feedback value from detection module 370, etc. In some embodiments, the execution driver 380 may include thyristor trigger circuit, GTO drive circuit, GTR drive circuit, MOSFET drive circuit, IGBT drive circuit, and/or any combination of them. The execution unit may include a solenoid actuator, a cooling fan, a pedal actuator, etc.

Figure 4:
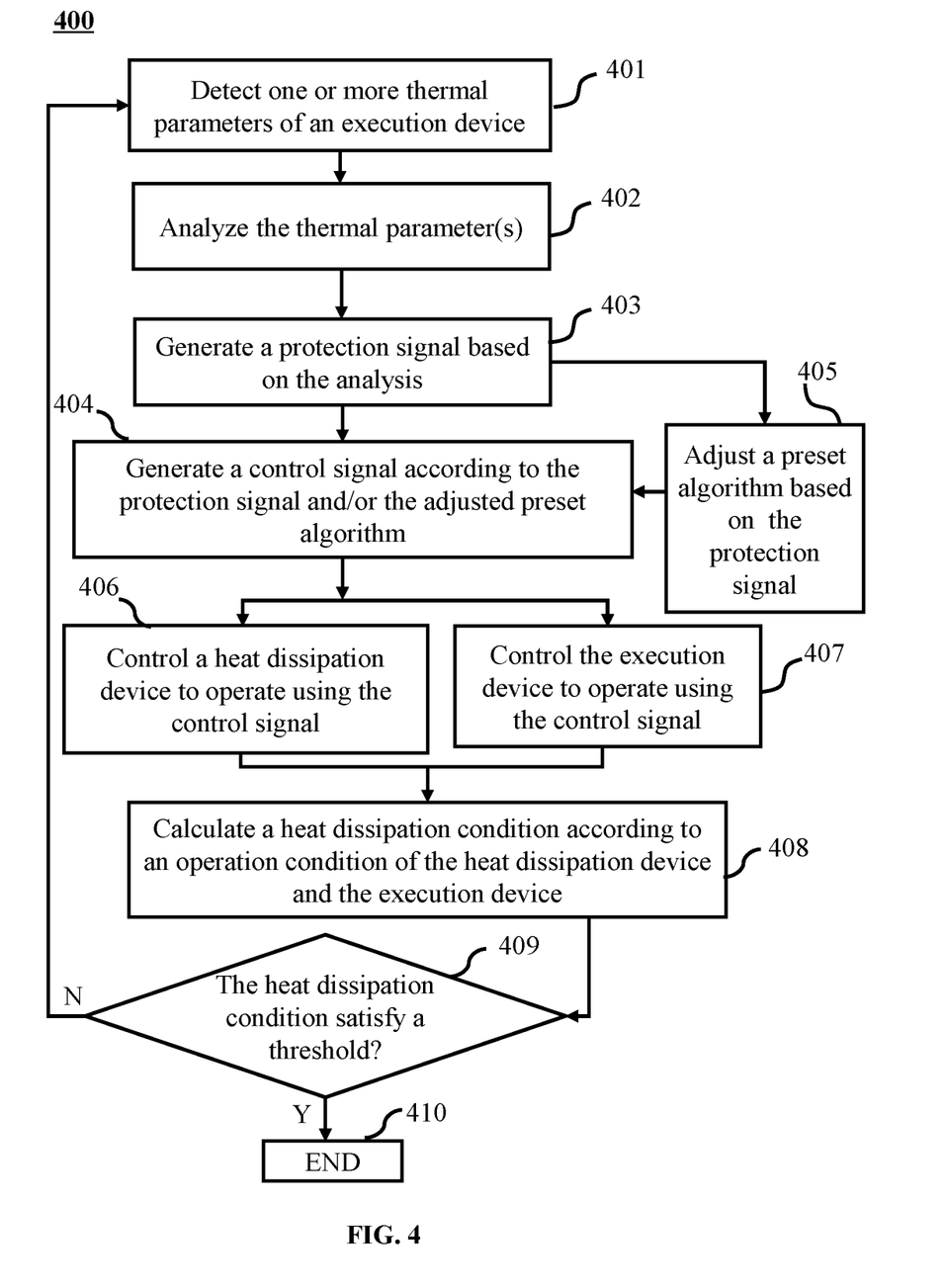
FIG. 4 is a flowchart illustrating an example of a heat dissipation process for a smart piano according to some embodiments of the present disclosure.

FIG. 4 is a flowchart illustrating an example 400 of a heat dissipation process for a smart piano according to some embodiments of the present disclosure. The heat dissipation process may be executed by the heat dissipation system 200. In some embodiments, the heat dissipation process can be performed to prevent an execution device of the smart piano (e.g., the execution engine 240 as described in conjunction with FIGS. 2-3) from overheating.

In step 401, one or more thermal parameters of an execution device of the smart piano may be detected. The execution device of the piano may be and/or include a solenoid actuator, a key actuator, a pedal actuator, a motor, or any other devices that may generate heat in the smart piano, or the like, or a combination thereof. Each of the thermal parameters may represent any information related to heat generated by the execution device during one or more operations of the smart piano. Exemplary thermal parameters may include but not are limited to a temperature value, a thermal radiation intensity, or the like, or a combination thereof. The thermal parameters may be detected by one or more sensors. In some embodiments, the sensors may include one or more sensors in the detection module 370. The sensors may include but are not limited to a temperature gauge, a thermometer, a thermocouple, a radiation detector, or the like, or a combination thereof. In some embodiments, various types of sensors may be configured to detect various thermal parameters. For example, a thermocouple may be used to detect one or more temperature values (e.g., a temperature of a solenoid actor, a temperature of a key actuator, a change in temperatures of the solenoid actor, a change in temperatures in the key actuator, or the like). As another example, a radiation detector can detect one or more radiation intensities of the execution unit. In some embodiments, one or more of the sensors may be configured based on the type(s) of the sensor(s). For example, a thermocouple may be coupled to the execution unit through a direct connection. More particularly, for example, the thermocouple may contact the execution unit 390. As another example, a radiation detector may be coupled to the execution unit through an indirect connection. More particularly, for example, the radiation detector does not have to be in direct contact with the execution unit in some embodiments.

In step 402, the thermal parameters may be analyzed. The analysis may be executed by the detection module 370 in some embodiments. A protection circuit (e.g., a circuit in the detection module 370) may be configured to analyze the one or more thermal parameters. The analysis may be performed in any suitable manner. For example, one or more of the thermal parameters may be converted into one or more electrical signals, such as a current signal, a voltage signal, or the like. Each of the electrical signals may be used as an analysis result of the analysis and may be used for further processing.

In step 403, a protection signal may be generated based on the analysis. The protection signal may be generated by the protection circuit. In some embodiments, the protection signal may include but not limit to information of an overheating degree of the execution unit 390. As used herein, the overheating degree may indicate how much the temperature of the execution unit 390 is greater than a reference temperature value. For example, the overheating degree may be determined based on a difference between the temperature of the execution unit and the reference temperature value. In a more particular example, the overheating degree may be the difference. In another more particular example, the overheating degree may be a ratio of the difference to the reference temperature value. The protection circuit may calculate the overheating degree according to the detected thermal parameters and a preset algorithm. In some embodiments, the thermal parameters may be compared to a preset value by a comparator to generate the protection signal. The protection signal may be further used to generate a control signal and/or to adjust the preset algorithm.

In step 405, a preset algorithm may be adjusted based on the protection signal. In some embodiments, the preset algorithm may be an algorithm that can be used to perform the heat dissipation process and/or to determine how to operate the heat dissipation device and/or the execution device. For instance, the preset algorithm may be used to adjust a power of the heat dissipation unit 330 and/or to protect the heat dissipation unit 330 from overheating. More particularly, for example, a maximum power of the heat dissipation unit 330 may be stored in the storage module 212. The preset algorithm may be used to limit an output power of the heat dissipation unit 330 for overheat protection. The heat dissipation unit 330 may correspond to the maximum power. When the overheating degree of the execution unit 390 reaches a predetermined threshold, a particular output power of the heat dissipation unit 330 may be necessary to protect the execution unit 390 and/or any other device. The particular output power may be greater than the maximum power. The preset algorithm may be adjusted based on the overheating degree. For example, the preset algorithm may be adjusted to increase the maximum power that can be applied to the heat dissipation unit 330. As another example, the preset algorithm may be adjusted to not limit the output power of the heat dissipation unit 330. Such adjustment may cause damage to the heat dissipation unit 330 but may protect the execution unit 390.

In step 404, a control signal may be generated according to the protection signal and/or the adjusted preset algorithm. In some embodiments, the control signal may be generated by the control module 340. The control signal may be used to control operations of the heat dissipation operation module 310 and/or the execution engine 240. In some embodiments, the control signal may be generated based on the overheating degree information included in the protection signal. For example, a control signal may be generated to increase the output power of heat dissipation unit 330 and/or to decrease the output power of the execution unit 390 in response to detecting a particular overheating degree (e.g., a generation method of the control signal may be included in the preset algorithm.). In some embodiments, the control signal may be generated based on the adjusted algorithm. For example, the maximum output power of the heat dissipation unit 330 may be limited, or a minimum output power of the execution unit 390 may be limited to keep the smart piano work normally. In some embodiments, multiple control signals can be generated to control operations of multiple devices. For example, a first control signal can be generated to control one or more operations of the heat dissipation driver 320. As another example, a second control signal can be generated to control one or more operations of the execution driver.

In step 406, a heat dissipation device may be controlled to operate using the control signal. In some embodiments, the heat dissipation device may be and/or include the heat dissipation operation module 310 of FIG. 3. The control signal may include a first control signal to operate the heat dissipation driver 320 in the heat dissipation operation module 310. The first control signal may assist determining how to operate the heat dissipation driver 320. In some embodiments, the time interval to operate the heat dissipation driver 320 may be determined according to the first control signal. In some embodiments, the average output power of the heat dissipation driver 320 may be determined according to the first control signal. Based on the output condition of the heat dissipation driver 320, the output driver signal of the heat dissipation driver 320 may be adjusted according to the first control signal. The heat dissipation unit 330 may be operated based on the output driver signal of the heat dissipation driver 320. The output power of the heat dissipation unit 330 may be determined according to the first control signal. In some embodiments, the output power of the heat dissipation unit 330 may be increased if the overheating degree of the execution unit 390 is relatively high (e.g., being greater than or equal to a threshold). The operation condition of the heat dissipation unit 330 may be recorded for further calculation. In some embodiments, the output power and the corresponding operation time interval may be recorded to calculate the total heat dissipation in that operation time interval.

In step 407, one or more operations of the execution device may be controlled using the control signal. The control signal may include a second control signal to operate the execution driver 380 in the execution engine 240. The second control signal may be used to control operations of the execution driver 380. In some embodiments, the time interval to operate the execution driver 380 may be determined according to the second control signal. In some embodiments, the average output power of the execution driver 380 may be determined according to the second control signal. Based on the output condition of the execution driver 380, the output driver signal of the execution driver 380 may be adjusted according to the second control signal. The execution unit 390 may be operated based on the output driver signal of the execution driver 380. The second control signal may determine the output power of the execution unit 390. In some embodiments, the maximum output power of the execution unit 390 may be limited if the overheating degree of the execution unit 390 is relatively high (e.g., being greater than or equal to a threshold). The operation condition of the execution unit 390 may be recorded for further calculation. In some embodiments, the output power and corresponding operation time interval may be recorded to calculate the total heat generation in that operation time interval.

In step 408, a heat dissipation condition may be determined according to the operation condition of the heat dissipation device and the execution device. In some embodiments, the determination may be made by the processing engine 210 of FIG. 2. The heat dissipation condition may be represented by one or more reference values indicative of an operation condition of the heat dissipation device and/or the execution device. For example, the heat dissipation condition may be determined by calculating a difference value between an amount of heat dissipated by the heat dissipation device and an amount of heat generated by the execution device during a certain time period. If the amount of the dissipated heat is greater than the amount of the generated heat, the heat dissipation condition may be considered as being good. Otherwise, the heat dissipation condition may be considered as being bad.

In step 409, a determination may be made as to whether the process is to be continued and/or whether to perform at least one heat dissipation operation. In some embodiments, the determination may be made based on the heat dissipation condition. For example, the difference value may be compared with a threshold. The threshold may be a predetermined value, an adaptive value, and/or any other value. In some embodiments, the threshold may be determined by the smart piano based on data and/or information related to previous heat dissipation conditions. In some embodiments, the threshold may be a value set by a user. In some embodiments, in response to determining that the difference value is greater than the threshold, the process may determine that the heat dissipation condition is good and may end at step 410. Alternatively, in response to determining that the difference value is not greater than the threshold, the process may loop back to step 401.

It should be noted that the above description of the heat dissipation process is merely provided for the purposes of illustration, and not intended to limit the scope of the present disclosure. For persons having ordinary skills in the art, multiple variations and modifications may be made under the teachings of the present disclosure. For example, the preset algorithm may not be adjusted based on the protection signal, but be continuously used during the heat dissipation process. In some embodiments, the control signal may be used to control the heat dissipation device and the execution device simultaneously.

Figure 5:
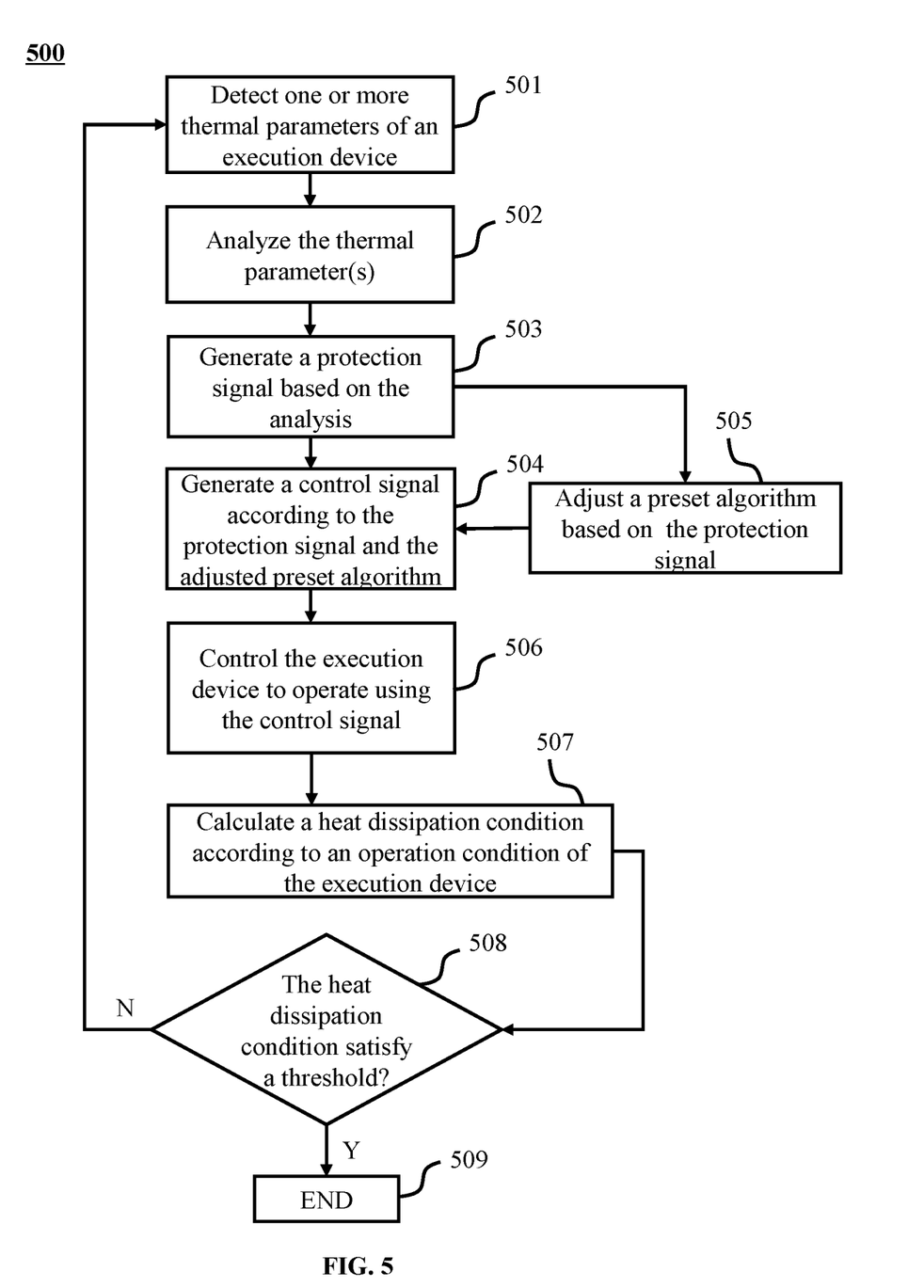
FIG. 5 is a flowchart illustrating an example of heat dissipation process for a smart piano according to some embodiments of the present disclosure.

FIG. 5 is a flowchart illustrating an example 500 of heat dissipation process for a smart piano according to some embodiments of the present disclosure. In some embodiments, the heat dissipation engine 250 does not have to include a heat dissipation operation module 310. The heat generated by the execution unit 390 may be dissipated naturally. In this case, to prevent the execution unit 390 from overheating, the heat generation rate of the execution unit 390 may be limited. The limitation of the heat generation rate may be made by controlling the output power of the execution unit 390. The steps from 501 to 505 may be the same as disclosed in FIG. 4. In some embodiments, the natural dissipation rate may be recorded in the preset algorithm in step 505 for further calculation.

In step 506, one or more operations of the execution device may be controlled using the control signal. In some embodiments, the controlling may include but not is limited to adjusting the output power of the execution unit 390, stopping and/or ceasing operations the execution unit 390 for a time period, or the like, or a combination thereof. The controlling method may be included in the preset algorithm in step 505. The operation condition of the execution unit 390 may be recorded for further calculation. In some embodiments, the output power and corresponding operation time interval may be recorded to calculate the total heat generation in that operation time interval.

In step 507, the heat dissipation condition may be determined according to the operation condition of the execution device. In some embodiments, the operation condition of the execution device may refer to the total heat generation of the execution unit 390 in a certain operation time interval. The total amount of heat generated by the execution device may be compared with the amount of heat dissipated naturally by the execution device in the certain operation time interval. The calculation result may be a difference value between the amount of heat generated and dissipated by the execution device.

In step 508, a determination may be made as to whether the process is to be continued and/or whether to perform at least one heat dissipation operation. The determination may be made by performing one or more operations as described in conjunction with step 409 above. The threshold in step 508 may or may not be different from the threshold in step 409 in light of various dissipation abilities of the devices implementing processes 500 and 400. In some embodiments, in response to determining that the difference value is greater than the threshold, the process may determine that the heat dissipation condition is good and may end at step 509. Alternatively, in response to determining that the difference value is not greater than the threshold, the process may loop back to step 501.

Figure 6:
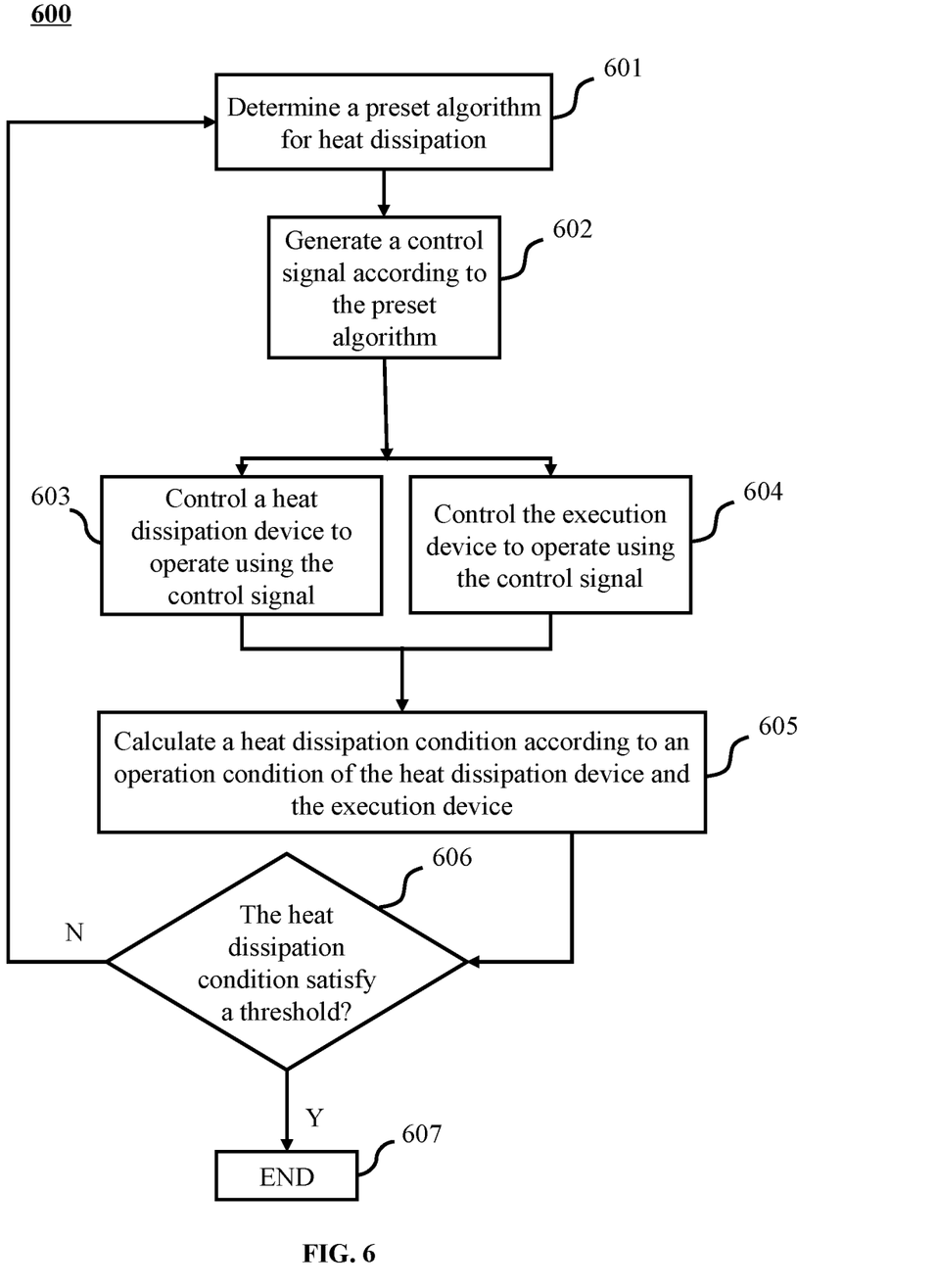
FIG. 6 is a flowchart illustrating an example of a heat dissipation process for a smart piano according to some embodiments of the present disclosure.

FIG. 6 is a flowchart illustrating an example of 600 of a heat dissipation process for a smart piano according to some embodiments of the present disclosure. In some embodiments, the detection module 370 may not be included in the heat dissipation operation engine 250. In this case, the control signal may be generated according to a preset algorithm but not according to a detected thermal parameter.

In step 601, a preset algorithm for heat dissipation may be determined. In some embodiments, the preset algorithm may be an algorithm that may be used to determine a control signal to control the heat dissipation device and/or the execution device. For example, the preset algorithm may be used to determine how to operate the heat dissipation unit 330 and/or the execution unit 390. In some embodiments, the heat dissipation unit 330 may work in a constant output power according to the preset algorithm. In such embodiments, an amount of heat dissipated by the heat dissipation unit 330 during a certain time period may be determined according to the constant output power and the dissipation ability of the heat dissipation unit 330. In some embodiments, the heat dissipation unit 330 may work in a changeable output power according to the preset algorithm in response to an execution demand of the execution unit 390. For example, in a time period, the execution demand of the execution unit 390 may increase. The output power of the heat dissipation unit 330 may increase either. In some embodiments, the heat dissipation ability of the heat dissipation unit 330 and the execution demand of the execution unit 390 may be considered according to the preset algorithm simultaneously. For example, if the execution demand increases too much that may exceed the heat dissipation ability of the heat dissipation unit 330, the heat dissipation unit 330 may work in its maximum output power constantly and the work condition of the execution unit 390 may be limited according to the preset algorithm. In some embodiments, limiting the work condition of the execution unit 390 may include limiting the maximum output power of which, or stopping the execution 390 for a time interval.

In step 602, a control signal may be generated according to the preset algorithm. The control signal may be generated by performing one or more operations as described in connection with step 404 above. In some embodiments, steps 603, 604, and 605 may be performed in substantially the same way as steps 406, 407, and 408.

In step 606, a determination may be made as to whether the process is to be continued and/or whether to perform at least one heat dissipation operation. The assessment algorithm may be the same as disclosed in step 409. The threshold in step 606 may be different from the threshold in step 409 because of the differences of the preset algorithm. In some embodiments, if the heat dissipation condition satisfies the threshold (e.g., being greater than or equal to the threshold), the process may end at step 607. Alternatively, the process may proceed to 601 in response to determining that the heat dissipation condition does not satisfy the threshold.

It should be noted that the above steps of the flow diagrams of FIGS. 4-6 can be executed or performed in any order or sequence not limited to the order and sequence shown and described in the figures. Also, some of the above steps of the flow diagrams of FIGS. 4-6 can be executed or performed substantially simultaneously where appropriate or in parallel to reduce latency and processing times. Furthermore, it should be noted that FIGS. 4-6 are provided as examples only. At least some of the steps shown in these figures can be performed in a different order than represented, performed concurrently, or altogether omitted.

Figure 7:
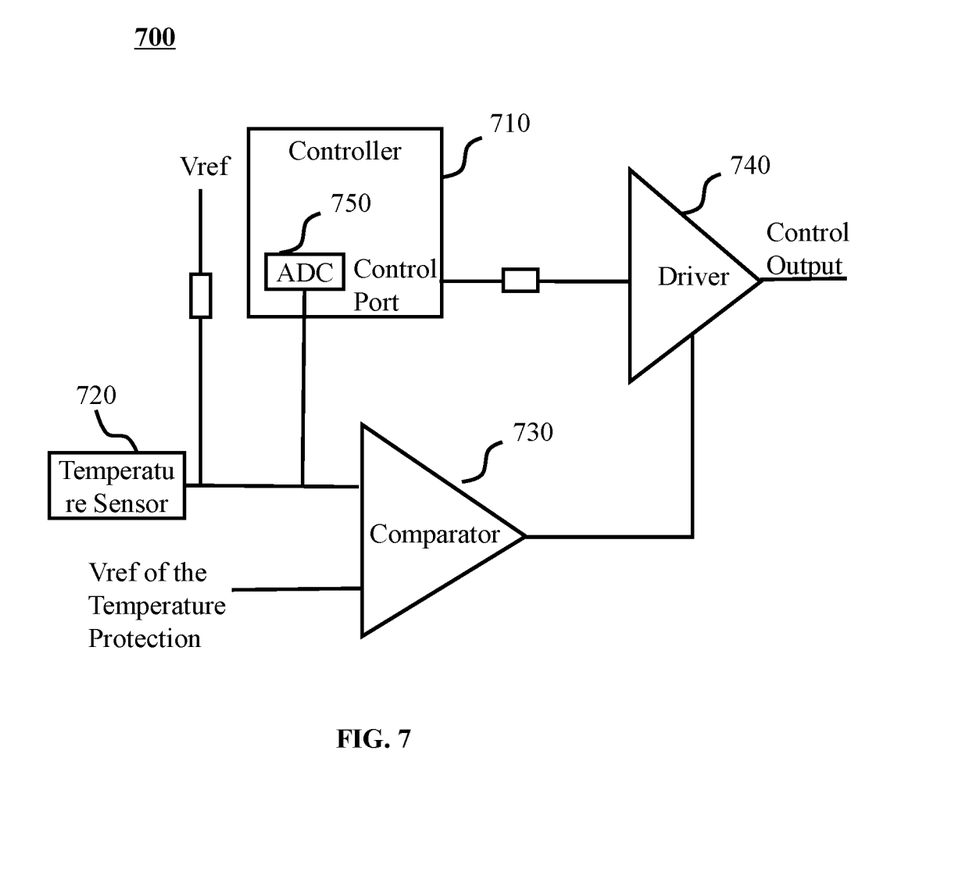
FIG. 7 is an example of a detection module according to some embodiments of the present disclosure.

FIG. 7 is an example of the detection module according to some embodiments of the present disclosure. The detection module 370 may include a controller 710, a temperature sensor 720, a comparator 730, and a driver 740. An ADC (Analog to Digital Convertor) 750 may be included in the controller 710. The temperature of the execution unit 390 may be detected by the temperature sensor 720 firstly. The output of the temperature sensor 702 may be a voltage signal include the temperature information of the execution unit 390. The voltage signal may be an analog signal and may be further converted into a digital signal by the ADC 750 in the controller 710. The converted digital signal including the temperature information of the execution unit 390 may be compared to a reference voltage of the temperature protection by the comparator 730. The comparison result may be transmitted to the Driver 740 to generate a protection signal to the control module 340.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "generating," "providing," "calculating," "executing," "storing," "producing," "determining," "obtaining," "calibrating," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in connectors, conductors, optical fibers, circuits, and any suitable media that is fleeting and devoid of any semblance of permanence during transmission, and/or any suitable intangible media.

It should be noted that the piano equipped with the heat dissipation system in some specific embodiments is provided for the purposes of illustration, and not intended to limit the scope of the present disclosure. Apparently, for persons having ordinary skills in the art, numerous variations and modifications may be conducted under the teaching of the present disclosure. However, those variations and modifications may not depart the protecting scope of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the present disclosure are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method for heat dissipation for a smart piano, comprising:
   detecting a thermal parameter of an execution device of the smart piano;
   analyzing the thermal parameter to generate a protection signal;
   determining a preset algorithm;
   generating, by a hardware processor, a control signal according to the protection signal and the preset algorithm; and
   controlling a heat dissipation condition of the smart piano.

2. The method of claim 1, wherein the controlling the heat dissipation condition of the smart piano comprises controlling an operation condition of the execution device.

3. The method of claim 1, wherein analyzing the thermal parameter to generate a protection signal comprises converting the thermal parameter into an electrical signal.

4. The method of claim 1, wherein determining the preset algorithm comprises adjusting the preset algorithm based on the protection signal.

5. The method of claim 2, wherein the controlling the heat dissipation condition of the smart piano further comprises controlling an operation condition of a heat dissipation device.

6. The method of claim 2, wherein the method further comprises calculating the heat dissipation condition according to the operation condition of the execution device.

7. The method of claim 2, wherein the controlling the operation condition of the execution device comprises controlling an output power of the execution device.

8. The method of claim 5, wherein the method further comprises calculating the heat dissipation condition according to the operation condition of the heat dissipation device and the operation condition of the execution device.

9. The method of claim 5, wherein the controlling the operation condition of a heat dissipation device comprises controlling an output power of the heat dissipation device.

10. The method of claim 6, wherein the method further comprises:
    comparing the heat dissipation condition with a threshold; and
    determining whether to perform at least one heat dissipation operation based on the comparison result.

11. A heat dissipation system for a smart piano, comprising:
    a heat dissipation driver;
    a heat dissipation device;
    a sensor configured to detect a thermal parameter of an execution device of the smart piano;
    a protection circuit configured to analyze the thermal parameter to generate a protection signal; and
    a hardware processor configured to:
        determine a preset algorithm,
        generate a control signal according to the protection signal and the preset algorithm, and
        control a heat dissipation condition of the smart piano.

12. The system of claim 11, wherein, to control the heat dissipation condition of the smart piano, the hardware processor is further configured to control an operation condition of the execution device.

13. The system of claim 11, wherein, to analyze the thermal parameter to generate the protection signal, the protection circuit is further configured to convert the thermal parameter into an electrical signal.

14. The system of claim 11, wherein, to determine the preset algorithm, the hardware processor is further configured to adjust the preset algorithm based on the protection signal.

15. The system of claim 12, wherein, to control the heat dissipation condition of the smart piano, the hardware processor further configured to control an operation condition of the heat dissipation device.

16. The system of claim 12, wherein the hardware processor is further configured to calculate the heat dissipation condition according to the operation condition of the execution device.

17. The system of claim 12, wherein, to control the operation condition of the execution device, the hardware processor is further configured to control an output power of the execution device.

18. The system of claim 15, wherein the hardware processor is further configured to calculate the heat dissipation condition according to the operation condition of the heat dissipation device and the operation condition of the execution device.

19. The system of claim 15, wherein, to control the operation condition of the heat dissipation device, the hardware processor is further configured to control an output power of the heat dissipation device.

20. The system of claim 16, wherein the hardware processor is further configured to:
    compare the heat dissipation condition with a threshold; and
    determine whether to perform at least one heat dissipation operation based on the comparison result.

* * * * *